United States Patent [19]

Oosthuizen

[11] Patent Number: 5,408,164
[45] Date of Patent: Apr. 18, 1995

[54] DIFFERENTIAL SPEED CONTROL OF ELECTRIC MOTORS

[75] Inventor: Ralph Oosthuizen, Johannesburg, South Africa

[73] Assignee: Eimco Mining Machinery (Proprietary) Ltd., Transvaal, South Africa

[21] Appl. No.: 992,463

[22] Filed: Dec. 17, 1992

[30] Foreign Application Priority Data

Dec. 23, 1991 [ZA] South Africa ............. 91/10123

[51] Int. Cl.$^6$ ............................................. H02P 7/685
[52] U.S. Cl. ................................................ 318/66; 318/71
[58] Field of Search ................. 318/41, 45, 52, 66, 318/68, 77, 98, 99, 106, 113, 434, 69, 70, 71

[56] References Cited

U.S. PATENT DOCUMENTS

| | | | |
|---|---|---|---|
| 2,773,227 | 12/1956 | Lillquist | 318/52 |
| 2,930,957 | 3/1960 | Cronberger | 318/52 |
| 3,263,142 | 7/1966 | Adoutte et al. | 318/99 |
| 3,551,775 | 12/1970 | Safiuddin | 318/434 |
| 3,562,612 | 2/1971 | Munson | 318/106 |
| 3,688,167 | 8/1972 | Ivey et al. | 318/45 |
| 3,760,246 | 9/1973 | Gurwicz et al. | 318/52 |
| 3,845,366 | 10/1974 | Metzler et al. | 318/99 |
| 4,633,147 | 12/1986 | Posma et al. | 318/52 |
| 5,163,170 | 11/1992 | Grabowski | 318/113 |

Primary Examiner—Bentsu Ro
Attorney, Agent, or Firm—Felfe & Lynch

[57] ABSTRACT

The invention relates to apparatus for controlling a plurality of electric motors. The apparatus includes drive means for applying electrical power to the motors at a predetermined current or voltage. Sensor means are provided for sensing the load on each motor. Comparator means, which include polarity detection means for generating at least one polarity signal representative of the combined polarity of the loads, and summing means for deriving a magnitude signal representative of the loads, are used to determine the relative magnitudes of the loads. Control means are arranged to generate a compensation signal which is applied to the drive means to reduce the power applied to the more heavily loaded motor or motors. The control means typically includes switching means responsive to the polarity detection means for determining the polarity of the magnitude signal, thereby to obtain the compensation signal. The invention extends to a method of controlling a plurality of electric motors.

10 Claims, 2 Drawing Sheets

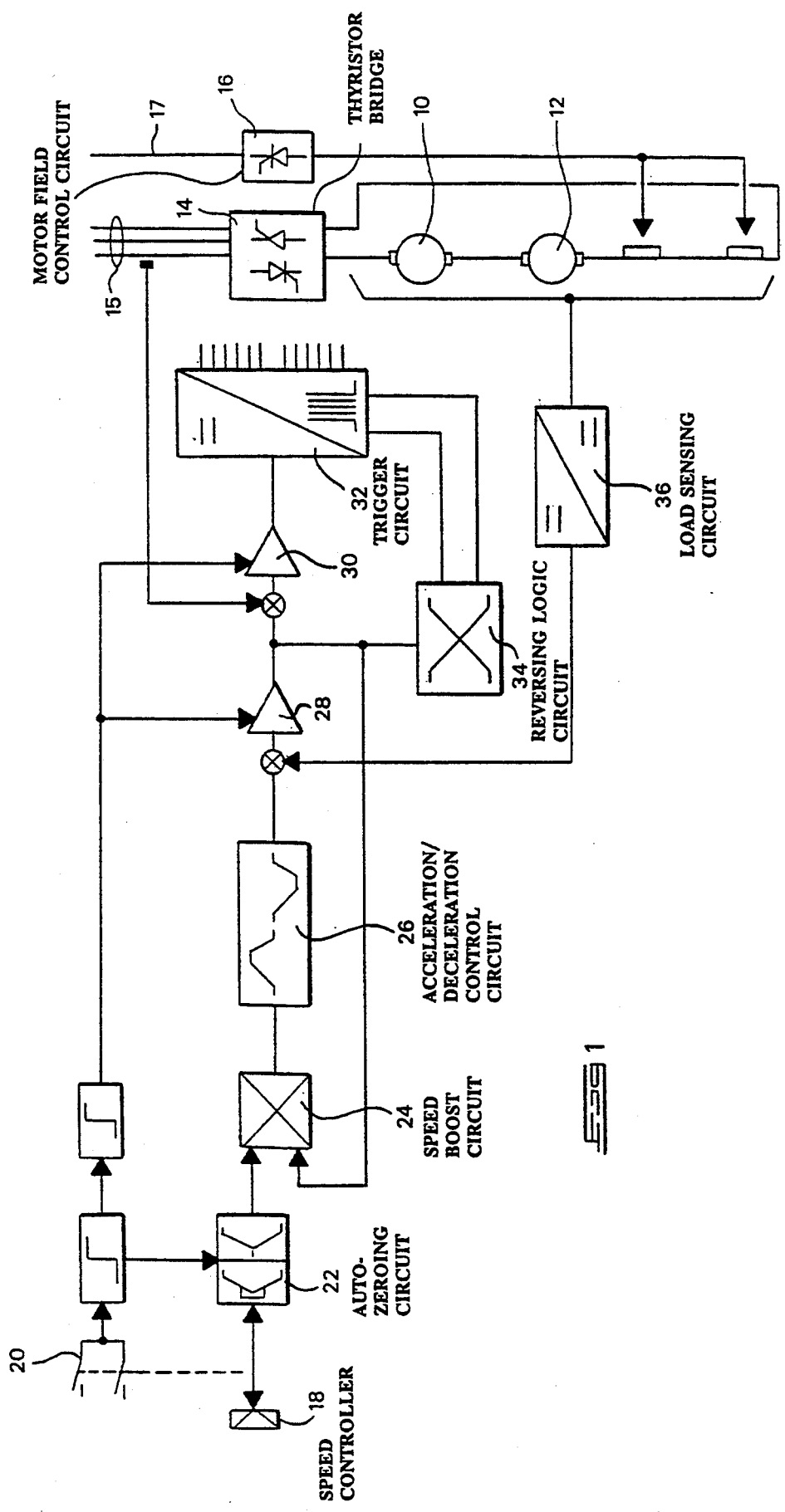

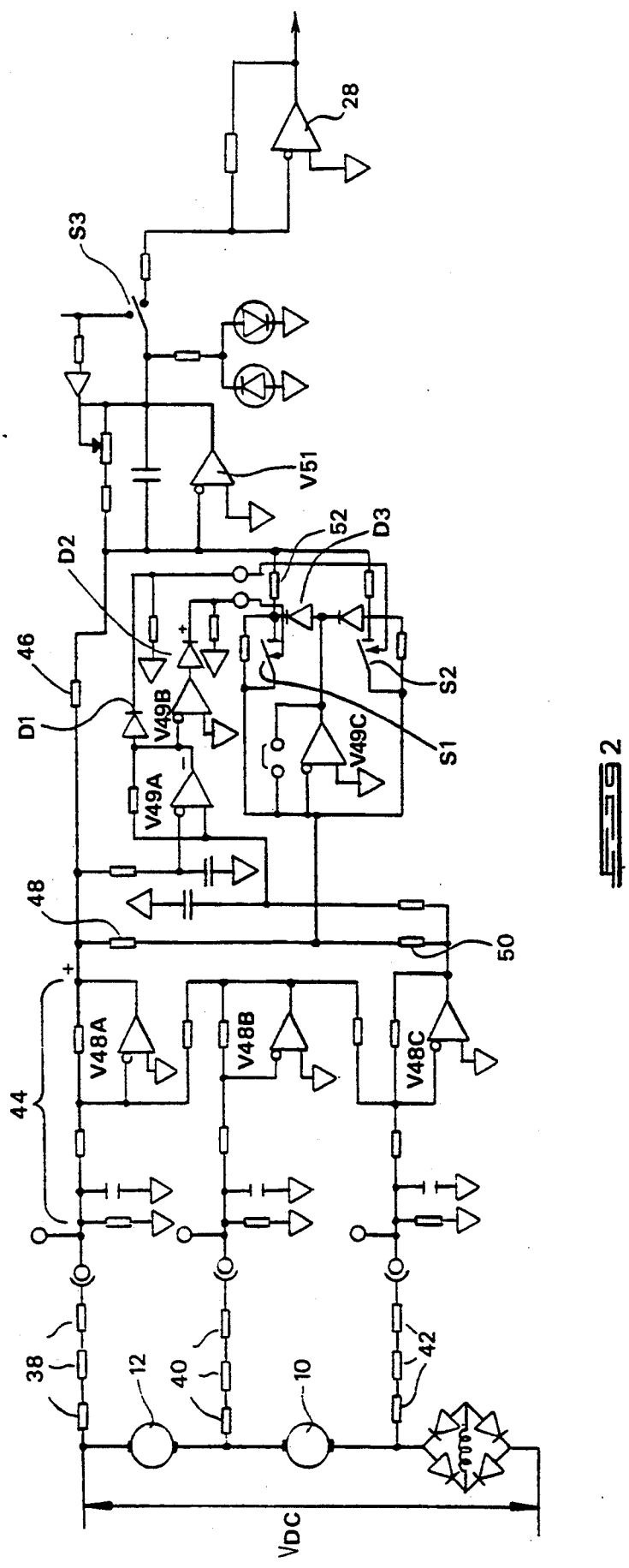

DIFFERENTIAL SPEED CONTROL OF ELECTRIC MOTORS

BACKGROUND TO THE INVENTION

This invention relates to apparatus for controlling a plurality of electric motors under variable load conditions.

Shuttle cars used in underground mines commonly have independently driven wheels, with pairs of wheels on each side of the vehicle being driven by their own electric motor. In certain situations, one motor may be loaded more heavily than the other for instance, when turning a corner, the motor for the innermost wheels is loaded more heavily than that for the outermost wheels. With conventional motor controllers, the loading of one motor may result in an over-voltage being applied to the other motor, which may be damaged by the over-voltage or the resulting over-speed. The controller may also attempt to increase the power supply to the more heavily loaded motor, which may damage that motor.

SUMMARY OF THE INVENTION

According to a first aspect of the invention there is provided apparatus for controlling a plurality of electric motors comprising:
- drive means for applying electrical power to the motors at a predetermined current or voltage;
- sensor means for sensing the load on each motor;
- comparator means for determining the relative magnitudes of the loads; and
- control means for generating a compensation signal which is applied to the drive means to reduce the power applied to the more heavily loaded motor or motors.

Preferably, the comparator means includes polarity detection means for generating at least one polarity signal representative of the combined polarity of the loads, and summing means for deriving a magnitude signal representative of the loads.

Conveniently, the control means includes switching means responsive to the polarity detection means for determining the polarity of the magnitude signal, thereby to obtain the compensation signal.

Advantageously, the switching means includes first and second switches for selectively allowing the passage of positive or negative compensation signals.

The motors preferably have their armatures connected in series, and the sensor means comprise a plurality of resistors arranged to sense the armature voltage across the motors, and a high common mode rejection circuit for maintaining the integrity of the armature voltages.

The drive means may be arranged to apply electrical power to the motors at a voltage which is predetermined by a control device, the control means operating to reduce the voltage applied to the more heavily loaded motor or motors.

According to a second aspect of the invention there is provided a method of controlling a plurality of electric motors comprising the steps of:
a) applying electrical power to the motors at a predetermined current or voltage;
b) sensing the loads on each motor;
c) determining the relative magnitudes of the loads; and
d) reducing the power applied to the more heavily loaded motor or motors according to the difference in the loads.

Preferably, the method includes the steps of generating at least one polarity signal representative of the combined polarity of the loads, and deriving a magnitude signal representative of the difference between the absolute magnitudes of the loads.

Conveniently, the method includes the step of obtaining the polarity of the magnitude signal by means of the polarity signal, thereby to obtain a compensation signal for reducing the power applied to the more heavily loaded motor or motors.

BRIEF DESCRIPTION OF THE DRAWINGS

FIG. 1 shows a schematic block diagram of a vehicle speed control system including a differential speed control circuit according to the invention; and FIG. 2 shows a detailed circuit diagram of the differential speed control circuit of the invention.

DESCRIPTION OF AN EMBODIMENT

Referring first to FIG. 1, the drawing shows a vehicle speed control system which is used to control forward and reverse operation of an electrically powered shuttle car used in underground mining. A pair of motors 10 and 12 are controlled by a drive circuit which includes a four quadrant thyristor bridge 14 fed by a three-phase 550 V supply 15 and a motor field control circuit 16 fed by an 8 V bias supply 17.

Speed control signals for the shuttle car are generated by a speed controller 18 which is operated by forward and reverse foot switches 20. The output of the speed controller 18 is fed via to an auto-zeroing circuit 22, a load dependent speed boost circuit 24 and an adjustable rate acceleration/deceleration control circuit 26, to a speed/voltage regulator 28. The output of the regulator 28 is fed to a current regulator 30 and thence to a twelve thyristor trigger circuit 32 which controls the operation of the motor drive circuit. The current regulator has an additional input. A four quadrant reversing logic circuit 34 is included in the circuit, as well as a motor load sensing circuit 36. The load sensing circuit 36 is illustrated in greater detail in FIG. 2.

In FIG. 2, the motors 10 and 12 are seen to have their armatures connected in series. The motors also have series field windings. The load sensing circuit 36 employs three sets of high value resistors 38, 40 and 42 to sense the armature voltages of the motors. The monitored voltages are fed to a high rejection common mode rejection (CMR) circuit 44 which includes three operational amplifiers V48A, V48B and V48C. The common mode rejection arrangement ensures that the amplified voltages at the outputs of the operational amplifiers V48A and V48C are true representations of the actual voltages across the armatures of the motors 12 and 10, respectively.

With equal loads applied to each of the motors, the voltages across the motors will be balanced, and the voltage at the output of the opamp V48A will be equal to that of (but of opposite polarity to) the opamp V48C. The output of the opamp V48A is used as a feedback signal via a resistor 46 to the input of a variable gain inverter V51.

Under the above conditions, the output of an operational amplifier V49C is zero volts, since the summing currents which are applied to its input from the opamps V48A and V48C via a pair of resistors 48 and 50 are equal, though of opposite polarity. The polarities of the output signals derived from the armature voltages are detected by an opamp V49A. The output of the opamp V49A is inverted by an opamp V49B which is connected as an inverter.

Assuming that the output of the opamp V48A is positive compared to that of the opamp V48C, the output of the polarity detector opamp V49A will be negative (−14 V), while the output of the inverter opamp V49B be positive (+14 V). These outputs reverse with polarity change of the outputs of the opamps V48A and V48C.

A pair of solid state switches S1 and S2 are provided which are normally closed and which are opened by a HIGH at their control pins from the outputs of the opamps V49A and V49B, via respective diodes D1 and D2. It can be seen, therefore, that with the voltage at the output of the opamp V48A being positive with respect to that at the output of the opamp V48C, the switch S1 will be open and the switch S2 closed.

This function reverses with a change in polarity of the motor voltage.

With balanced motor operation, the output of the opamp V49C will approach zero, and will have no effect. However, should the voltage across the motor 12 start to drop due to increased load on the motor, so that the voltage at the output of the opamp V48A drops from a positive value with respect to that of the negative value at the output of the opamp V48C, the resulting unbalanced summing currents at the input of the opamp V49C will cause its output to rise positively and to pass a compensating signal via a diode D3 and a resistor 52 to the summing input of the variable gain inverter V51. This has the effect of offsetting the reduction in the total feedback voltage from both motors, so that the originally set voltage across the motor 10 is maintained, while that across the more heavily loaded motor 12 is allowed to drop.

Should the voltage across the motor 10 start to drop with respect to that across the motor 12 due to loading, the output of the opamp V49C is prevented from going positive by the fact that the switch S1 is closed, with the output of the opamp V48A still acting as the effective feedback signal via the resistor 46.

With reversal of the motor voltages the control function of the circuit reverses, with the switch S1 opening and the switch S2 closing. The output of the opamp V48A still acts as the effective feedback signal via the resistor 46 to the summing input of the variable gain inverter V51 under a balanced motor loading. The entire circuit follows the polarity of the armatures of the motors 10 and 12. Thus, if a vehicle is travelling in the forward direction, the armature voltage of the motors 10 and 12 will be positive; if the vehicle is travelling in the reverse direction, the armature voltage of the motors 10 and 12 will be negative. A third solid state switch S3 is provided which is held closed, ensuring that the derived motor voltage feedback signal is allowed to pass from the output of the inverter V51 to the input of the speed/voltage regulator 28.

The speed controller of the invention protects the motors of the vehicle even in extreme conditions, for example when one wheel is stalled, while another is spinning freely. The controller also copes with the situation in which the vehicle is lifted up on its jacks with its wheels clear of the ground, as well as with more usual situations, such as running downhill or turning corners, in which conventional controllers may function unsatisfactorily.

I claim:

1. Apparatus for controlling the relative speeds of a plurality of electric motors under variable load conditions comprising:

drive means for applying electrical power to the motors at a predetermined voltage;

sensor means for sensing the loads on each motor;

comparator means operatively associated with said sensor means for determining the relative magnitudes of the loads; and control means operatively associated with said comparator means for generating a compensation signal which is applied to the drive means;

said drive means causing the voltage applied to at least one more heavily loaded motor to be reduced responsive to said compensation signal;

the comparator means including polarity detection means for generating at least one polarity signal representative of the combined polarity of the loads, and summing means for deriving a magnitude signal representative of the loads.

2. Apparatus according to claim 1 in which the control means includes switching means responsive to the polarity detection means for determining the polarity of the magnitude signal, thereby to obtain the compensation signal.

3. Apparatus according to claim 2 in which the switching means includes first and second switches selectively allowing the passage of positive or negative compensation signals.

4. Apparatus for controlling the relative speeds of a plurality of electric motors under variable load conditions comprising:

drive means for applying electrical power to the motors at a predetermined voltage;

sensor means for sensing the loads on each motor;

comparator means operatively associated with said sensor means for determining the relative magnitudes of the loads; and control means operatively associated with said comparator means for generating a compensation signal which is applied to the drive means;

said drive means causing the voltage applied to at least one more heavily loaded motor to be reduced responsive to said compensation signal;

the motors having their armatures connected in series, and the sensor means comprising a plurality of resistors arranged to sense the armature voltages across the motors, and a high common mode rejection circuit means for maintaining the integrity of the armature voltages.

5. A method of controlling the relative speeds of a plurality of electric motors under variable load conditions comprising the steps of:

a) applying electrical power to the motors at a predetermined voltage;

b) sensing the loads on each motor;

c) determining the relative magnitudes of the loads; and d) controlling the relative speeds of the motors when one of said motors becomes more heavily loaded than another, including the step of causing the voltage applied to said more heavily loaded motor to be reduced according to the difference in the loads, said method further including the steps of deriving a difference signal representative of the difference between the absolute magnitudes of the loads, deriving a summation signal representative of the sum of the absolute magnitudes of the load, adding the difference and summation signals to provide a compensation feedback signal, and applying the compensation feedback signal to a motor controller.

6. Apparatus for controlling the relative speeds of a plurality of electric motors under variable load conditions comprising:

drive means for applying electrical power to the motors at a predetermined voltage;

sensor means for sensing the loads on each motor;

comparator means operatively associated with said sensor means for determining the relative magnitudes of the loads; and control means operatively associated with said comparator means for generating a compensation signal which is applied to the drive means;

said drive means causing the voltage applied to at least one more heavily loaded motor to be reduced responsive to said compensation signal;

the motors being a pair of series connected motors, and the drive means applying a single DC voltage across both motors.

7. Apparatus for speed control of electric motors, comprising:

a motor arrangement comprising first and second electric motors;

drive means applying electrical power to said motors;

comparative load sensing means for sensing the difference between the loads on each of the motors, being connected with said motors said comparative load sensing means generating a control signal derived from said difference of loads and transmitting said control signal to said drive means;

said drive means reducing the voltage applied to at least one of said motors responsive to said control signal indicating a difference of the loads on the motors;

the electrical power applied to the motor arrangement being DC power;

said motors having first and second armatures, and said comparative load sensing means sensing the load on each motor by detecting the drop in voltage across the armature of the respective motor;

said comparative load sensing means including means for comparing the loads by combining the voltage drops across the motors in reverse polarity relative to each other to produce a first signal.

8. Apparatus according to claim 7 in which said means for comparing the loads includes a common mode rejection circuit.

9. Apparatus according to claim 7 in which said comparative load sensing means combines a second signal derived by a summation of the loads on the motor with said first signal to derive said control signal.

10. Apparatus according to claim 9 in which said drive means includes a motor controller receiving said control signal.

* * * * *